United States Patent
Francis et al.

(10) Patent No.: US 7,730,370 B2
(45) Date of Patent: Jun. 1, 2010

(54) APPARATUS AND METHOD FOR DISK READ CHECKING

(75) Inventors: Huw Francis, Winchester (GB); Timothy Finbarr McCarthy, Eastleigh (GB); Jonathan Ian Settle, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 11/871,291

(22) Filed: Oct. 12, 2007

(65) Prior Publication Data

US 2009/0100302 A1   Apr. 16, 2009

(30) Foreign Application Priority Data

Nov. 8, 2006   (GB) ................................ 0622224.4

(51) Int. Cl.
*G11C 29/00* (2006.01)
(52) U.S. Cl. ...................................................... 714/718
(58) Field of Classification Search ................. 714/118, 714/746, 6, 742; 711/113, 114
See application file for complete search history.

(56) References Cited

U.S. PATENT DOCUMENTS

| 6,161,165 | A  | * | 12/2000 | Solomon et al. | ............ 711/114 |
| 6,870,704 | B2 | * | 3/2005  | Shoda et al.   | ............ 360/97.02 |
| 7,017,107 | B2 | * | 3/2006  | Talagala et al.| ............ 714/819 |
| 7,062,704 | B2 | * | 6/2006  | Talagala et al.| ............ 714/819 |

* cited by examiner

*Primary Examiner*—Phung M Chung
(74) *Attorney, Agent, or Firm*—Jeffrey P. Aiello

(57) ABSTRACT

An apparatus and method for controlling a disk drive is provided. A disk lubricant sweep component for periodically initiates a disk lubricant spreading action. A disk data read check component checks data at one or more LBAs during the disk lubricant sweep. The apparatus may cache data from LBAs that have been checked by the disk data read check component and found correct and record LBAs that have been found correct, so that they can be omitted from subsequent operation of the read check component. The apparatus may further comprise an error checking and correcting component for checking and correcting data found incorrect by reason of a soft error, and an error reporting component for reporting on one or more LBAs that have been checked and found incorrect by reason of a hard error.

9 Claims, 2 Drawing Sheets

APPARATUS AND METHOD FOR DISK READ CHECKING

BACKGROUND OF THE INVENTION

1. Field of the Invention

The present invention relates to a technology for controlling disk drives, and in particular to a technology for controlling read checking of disk data with reduced overhead.

2. Background Information

In certain arrangements of Redundant Arrays of Inexpensive Disks (RAID arrays), facilities are provided for rebuilding data from a failed disk using data from other disks in the array. This is usually achieved by distributing (striping) copies of data from each disk across the other disks in the array, so that it can be retrieved and assembled together on a spare disk if a disk fails.

During RAID array rebuilds, failing hardware and firmware may encounter one or more further errors that prevent array rebuilds from completing and that may result in loss of access to data. When such a double fault occurs within a RAID array, the second fault is typically not discovered until the recovery action to rectify the first fault is implemented.

In a RAID array, when an array member disk is lost due to a hardware or software failure, an attempt is made to rebuild it with a 'spare disk', assuming of course that one is available. This reconstruction is achieved by reading data from the existing available disks. However if in the meantime a logical byte address (LBA) on another disk within the same array has also become corrupted but gone unnoticed—this will cause a problem and is often referred to as a "silent error".

One existing technique to reduce the likelihood of this silent error is an action called "data scrubbing". Depending upon how data scrubbing or any other active data integrity tool has been set up, the error may still not be found until a read is attempted, for the first time, to that particular LBA as part of the attempt to rebuild the array. This 'double hit' means that the array rebuild for the data from that particular LBA area cannot be successfully completed and the data is lost.

A conventional data scrubbing operation as known in the art is instigated by the host operating system and is set up by the customer and tailored for the system's individual needs. In most cases this is configured to run on either on a daily, weekly or monthly basis. In the worse case scenario, LBAs may thus only be checked every 30 days—assuming, of course, that data scrubbing is activated at all.

It would thus be desirable to have a technology for controlling disk drives, and in particular a technology for controlling read checking of disk data with reduced overhead.

SUMMARY OF THE INVENTION

In a first general embodiment, the invention provides an apparatus for controlling a disk drive, that comprises a disk lubricant sweep component for periodically initiating a disk lubricant spreading action; and a disk data read check component for checking data at one or more logical byte addresses during operation of said disk lubricant sweep component.

The apparatus further comprises a caching component for caching data from one or more logical byte addresses that have been checked by the disk data read check component and found correct.

The apparatus further comprises a read check recording component for recording that one or more logical byte addresses have been checked by the disk data read check component and found correct.

Logical byte addresses that have been recorded as checked by the disk data read check component and found correct are omitted from subsequent operation of the disk data read check component.

The apparatus further comprises an error checking and correcting component for checking and correcting data from one or more logical byte addresses that have been checked by the disk data read check component and found incorrect by reason of a soft error.

The apparatus further comprises an error reporting component for reporting on one or more logical byte addresses that have been checked by the disk data read check component and found incorrect by reason of a hard error.

The apparatus may be incorporated in a host bus adapter device.

The apparatus may, in one alternative embodiment, be incorporated in a disk drive control device.

In a second aspect, there may be provided a method for controlling a disk drive, that comprises periodically initiating a disk lubricant spreading action by a disk lubricant sweep component; and checking data, by a disk data read check component, at one or more logical byte addresses during operation of the disk lubricant sweep component.

The method further comprises a step of caching data from one or more logical byte addresses that have been checked by the disk data read check component and found correct.

The method further comprises a step of recording that one or more logical byte addresses have been checked by the disk data read check component and found correct.

Logical byte addresses that have been recorded as checked by said disk data read check component and found correct are omitted from subsequent operation of the disk data the check component.

The method further comprises a step of checking and correcting data from one or more logical byte addresses that have been checked by the disk data read check component and found incorrect by reason of a soft error.

The method further comprises the step of reporting on one or more logical byte addresses that have been checked by the disk data read check component and found incorrect by reason of a hard error.

In a third aspect, there is provided a data carrier having functional data thereon, the functional data comprising functional computer data structures to, when loaded into a computer system and operated upon thereby, enable the computer system to perform all the steps of a method according to the second aspect.

In a fourth aspect, there is provided a computer program comprising computer program code to, when loaded into a computer system and executed thereon, cause the computer system to perform all the steps of a method according to the second aspect.

BRIEF DESCRIPTION OF THE DRAWINGS

An embodiment of the present invention will now be described, by way of example only, with reference to the accompanying drawing figures, in which.

DESCRIPTION OF THE PREFERRED EMBODIMENTS

An embodiment of the invention is suitably implemented in a storage system in which a disk drive actuator moves periodically to ensure that a disk lubricant is spread across a platter surface. This is commonly referred to as a 'disk sweep', and consists of two phases: phase one comprises a seek action and phase two is when the head follows the target track. In a preferred embodiment of the present invention, a read check is performed on the data on the target track during the period when the head follows the target track. Thus, during the second phase, a 'proactive scrub' is invoked; that is, logical byte addresses, or LBAs that are normally ignored in a conventional disk lubricant sweep action are instead checked for accessibility and to ensure that the data can be correctly read.

If the scrub is maintained at the adapter level, the LBAs are proactively scrubbed and thus system resilience is enhanced, at no additional performance cost; furthermore, during a read check operation, the data may be cached at no performance impact. If the scrub is moved to the disk level, the efficiency of the overall disk scrub algorithm is enhanced because a record can be kept of each LBA that had already been scrubbed and there would thus be no need to use the normal periodic scrub algorithm to check LBAs that had already been proactively scrubbed during the disk lubricant sweep.

During the 'disk lubricant sweep' operation the drive thus also reads data. According to the invention this data is used to provide a valuable cross check of the status of the LBA and give an early indication of a possible failing LBA.

Figure 1:
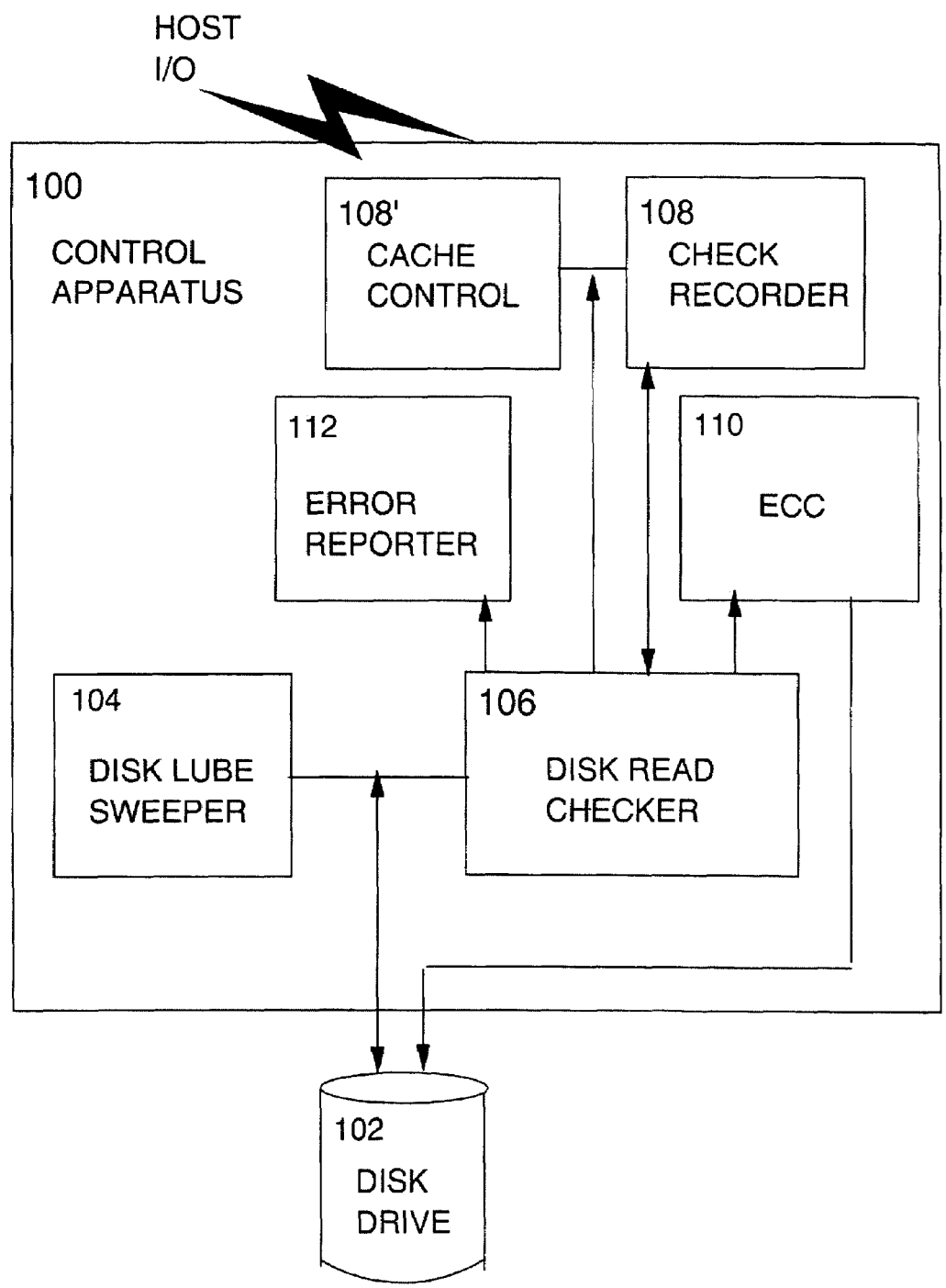
FIG. 1 shows in schematic form an arrangement of apparatus in accordance with one preferred embodiment of the invention.

Turning to FIG. 1, which shows an apparatus in accordance with one general embodiment of the invention, there is shown an apparatus 100 or arrangement of components operable in communication with host I/O and a disk drive 102, and comprising a disk lubricant sweeper component 104 operable simultaneously with a disk read checker component 106. The combined action of disk lubricant sweeper component 104 and disk read checker component 106 is to simultaneously sweep the lubricant over the disk surface of disk drive 102 by passing the read head over one or more tracks of a disk in disk drive 102 while checking the data from one or more LBAs on said one or more tracks.

Disk read checker 106 may optionally be operable in communication with check recorder component 108 to record each LBA that has been checked, so that the check can be bypassed on future scrubs, and further optionally with cache control component 108' to cache data that is found to be correct during the disk read check, thereby advantageously pre-caching data for future host read I/O at a low overhead.

In an alternative embodiment, the read data may be left uncached at this stage. Disk read checker 106 may further optionally be operable in communication with an error checking and recovery component 110 to cause an error correction action on data that is found to be incorrect during the disk read check by reason of a "soft" or recoverable error, thereby advantageously preemptively performing error correction prior to the need for data rebuild. Disk read checker may further optionally be operable in communication with an error reporting component 112 to cause an error report to be returned for data that is found to be incorrect during the disk read check by reason of a "hard" or unrecoverable error, thereby advantageously alerting a controller or host that an unrecoverable data error exists.

One embodiment of the invention in the form of an apparatus or arrangement of apparatus thus advantageously addresses the problem of providing a technology for controlling disk drives, and in particular a technology for controlling read checking of disk data with reduced overhead.

Figure 2:
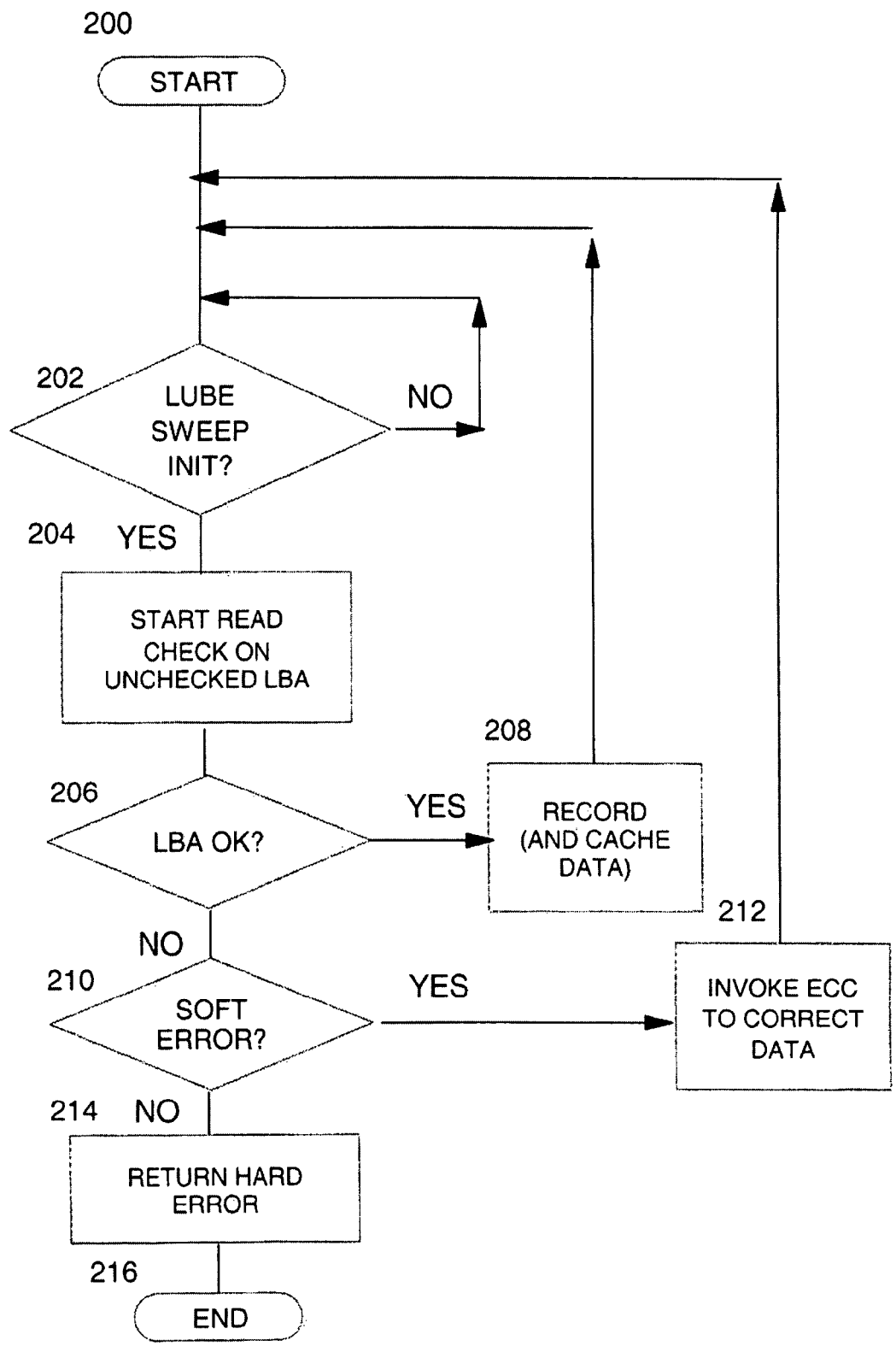
FIG. 2 shows in flowchart form one method or one logic arrangement in which a method of operation according to an embodiment of the invention may be implemented.

Turning now to FIG. 2, there are shown in flowchart form the steps of a method or logic arrangement according to one embodiment of the invention.

In FIG. 2, the method or logic arrangement includes steps beginning at START step 200, and at test step 202, it is determined whether a lubricant sweep has been initiated. If not, initiation is awaited. When a lubricant sweep is initiated, a read check action is performed at step 204. For the data at each LBA that is checked, test step 206 determines whether the data is correct or not. If the data is correct, step 208 may record the LBA that has been checked, so that it can be bypassed on future scrubs, and a cache control mechanism may optionally be invoked to cache the data for later use. The process then returns to test step 202.

If the data is determined at test step 206 to be incorrect, the error may be tested at step 210 to determine whether the error is a "soft" or recoverable error. If the determination at test step 210 is that the error is a soft error, an error checking and correction component or algorithm may be invoked at step 212 and the process returns to test step 202. If the error is determined at test step 210 not to be a soft error, a hard error indicator is returned for the LBA at step 214 and the process ends at END step 216.

One embodiment of the invention in the form of a method or logic arrangement thus advantageously addresses the problem of providing a technology for controlling disk drives, and in particular a technology for controlling read checking of disk data with reduced overhead.

The simultaneous disk sweep and scrub action may produce two possible outcomes:
1. Read is good—data may be passed to a cache or discarded.
2. Read is bad—this could then produce either a soft or hard error.
   2a. A soft error could be corrected via CRC/ECC
   2b. A hard error would be reported by the drive using the appropriate error reporting mechanism and then the adapter could choose to take the necessary recovery action.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or bard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause said computer infrastructure to perform all the steps of the method.

It will be clear to one skilled in the art that many improvements and modifications can be made to the foregoing exemplary embodiment without departing from the scope of the present invention.

What is claimed is:

1. An apparatus for controlling read checking of disk data of a disk drive, the apparatus comprising:
    a disk lubricant sweep component periodically initiating a disk lubricant spreading action for sweeping lubricant over a disk surface of the disk drive;
    a disk data read check component for checking data stored on the disk surface of the disk drive, the read check component checking data at one or more logical byte addresses as the disk lubricant sweep component sweeps lubricant over the surface of the disk for determining if data in a checked logical byte addresses is readable;
    a caching component for caching data from one or more logical byte addresses that have been checked by said disk data read check component and found correct; and
    a read check recording component for recording that one or more logical byte addresses have been checked by said disk data read check component and found correct, wherein logical byte addresses that have been recorded as checked by said disk data read check component and found correct are omitted from subsequent operation of said disk data read check component.

2. The apparatus as claimed in claim 1, further comprising an error checking and correcting component for checking and correcting data from one or more logical byte addresses that have been checked by said disk data read check component and found incorrect by reason of a soft error.

3. The apparatus as claimed in claim 2, further comprising an error reporting component for reporting on one or more logical byte addresses that have been checked by said disk data read check component and found incorrect by reason of a hard error.

4. The apparatus as claimed in claim 1, incorporated in a host bus adapter device.

5. The apparatus as claimed in claim 1, incorporated in a disk drive control device.

6. A method for controlling a disk drive, comprising the steps of:
    periodically sweeping lubricant over a disk surface of the disk drive;
    checking data stored at one or more logical byte addresses on the disk surface of the disk drive for determining if data in a checked logical byte addresses is readable, the data being checked simultaneously as the lubricant is swept over the disk surface;
    caching data from one or more logical byte addresses that have been checked and found correct; and
    recording that one or more logical byte addresses have been checked and found correct, wherein logical byte addresses that have been recorded as checked and found correct are omitted from subsequent data checking.

7. The method as claimed in claim 6, further comprising: checking and correcting data from one or more logical byte addresses that have been checked and found incorrect by reason of a soft error.

8. The method as claimed in claim 7, further comprising: reporting on one or more logical byte addresses that have been checked and found incorrect by reason of a hard error.

9. A computer program product comprising:
    a computer usable medium having computer usable program code embodied therewith, the computer usable program code comprising:
    computer usable program code configured to operate a disk lubricant sweep component for periodically sweeping lubricant over a disk surface of the disk drive;
    computer usable program code configured to operate a data read check component for checking data stored at one or more logical byte addresses on the disk surface for determining if data in a checked logical byte addresses is readable; and
    computer usable program code configured to simultaneously operate the data read check component with the sweep component to simultaneously sweep lubricant over the disk surface while the data read check component is checking data at one or more logical byte addresses for determining if data in a checked logical byte addresses is readable.

* * * * *